(12) United States Patent
Nobukiyo

(10) Patent No.: US 6,738,042 B1
(45) Date of Patent: May 18, 2004

(54) CHARACTER CONVERSION APPARATUS AND CHARACTER CONVERSION METHOD FOR PORTABLE INFORMATION APPARATUS

(75) Inventor: Takahiro Nobukiyo, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/473,258

(22) Filed: Dec. 27, 1999

(30) Foreign Application Priority Data

Dec. 28, 1998 (JP) .......................................... 10-374507

(51) Int. Cl.[7] .............................. G09G 5/08; G09G 5/00
(52) U.S. Cl. ........................................ 345/158; 345/156
(58) Field of Search ................................ 345/158, 156, 345/863, 864, 179

(56) References Cited

U.S. PATENT DOCUMENTS

| | | | | |
|---|---|---|---|---|
| 5,602,566 A | * | 2/1997 | Motosyuku et al. | 345/156 |
| 6,072,467 A | * | 6/2000 | Walker | 340/825.19 |
| 6,130,666 A | * | 10/2000 | Persidsky | 178/19.01 |

FOREIGN PATENT DOCUMENTS

| | | | | |
|---|---|---|---|---|
| JP | 6-4208 | | 1/1994 | |
| JP | 7-134641 | | 5/1995 | |
| JP | 08-016301 | * | 1/1996 | G06F/3/03 |
| JP | 9-297654 | | 11/1997 | |
| JP | 10-240434 | | 9/1998 | |
| JP | 10-333821 | | 12/1998 | |

OTHER PUBLICATIONS

English Computerized Traslation of JP04–004208.*
English language translation of relevant Office Action material enclosed in black line box.

* cited by examiner

*Primary Examiner*—Richard Hjerpe
*Assistant Examiner*—Alexander Eisen
(74) *Attorney, Agent, or Firm*—Michael Best & Friedrich LLP

(57) ABSTRACT

A character conversion apparatus for a portable information apparatus which can executes commands for selection of a character conversion candidate, determination, backspacing, escapement and so forth by a simple operation is disclosed. The character conversion apparatus includes a display apparatus, an inputting apparatus, a CPU, first to fourth acceleration sensors provided discretely on an upper side, a lower side, a left side and a right side of the body of the portable information apparatus, and a character database ROM. The acceleration sensors measure accelerations of the portable information apparatus when it is turned to be tilted longitudinally or laterally and measure directions of such turning movements of the portable information apparatus. Necessary functions regarding character inputting and character conversion are allocated individually to different results of the detection of the acceleration sensors, and the character conversion apparatus executes character inputting or conversion in response to one of the turning movements which is applied to the portable information apparatus.

12 Claims, 15 Drawing Sheets

CHARACTER CONVERSION APPARATUS AND CHARACTER CONVERSION METHOD FOR PORTABLE INFORMATION APPARATUS

BACKGROUND OF THE INVENTION

1. Field of the Invention

The present invention relates to a character conversion apparatus and a character conversion method for a portable information apparatus called PDA (Personal Digital Assistant) or a portable telephone set, and more particularly to a character conversion apparatus and character conversion method for a portable information apparatus which can input and execute a command such as selection of a character conversion candidate, determination, backspace or escapement.

2. Description of the Related Art

PDAs having various functions have been put into practical use including a PDA which implements functions similar to those of a personal computer of the notebook type and another PDA which attaches much importance to the portability while minimizing available functions. For example, one of such PDAs adopts a hand-writing inputting system which inputs a character or characters written on a liquid crystal display panel to achieve miniaturization of the apparatus body. Meanwhile, another PDA has a configuration similar to a personal computer of the notebook type in that it includes a liquid crystal monitor and a keyboard and is conveniently used to input data.

Conventionally, a small portable terminal such as a PDA or a portable telephone set which involves character conversion is disadvantageous in that it is difficult to operate it with one hand because a character inputting apparatus thereof has only a limited number of buttons or it is difficult to perform character conversion on it without taking a hand off a character inputting device. For example, Japanese Patent Laid-Open No. Hei 9-297654 discloses an apparatus wherein a character is inputted by a streak along which a pen called casing is moved using a character recognition technique and the casing is swung strongly to effect character conversion. When the user swings the casing strongly in its longitudinal direction, an expansion spring installed in the casing is moved back and forth by expanding and contracting actions thereof as in a counter of an instrument for measuring the number of walking steps to depress a switch so that a signal for initiating character conversion is sent to a control section.

However, some technical difficulty is involved in character inputting to a portable information apparatus. For example, the apparatus disclosed in Japanese Patent Laid-Open No. Hei 9-297654 described above has the following problems.

The first problem is that a character obtained by character recognition cannot be settled. In order to settle a character obtained by character recognition, a key input is required. The reason is that only an amplitude in one direction is utilized and the forward and backward directions are not utilized.

The second problem is that erasure of a character before conversion and interruption of proceeding character conversion cannot be performed. In order to interrupt proceeding character conversion, a key input is required. The reason is similar to that of the first problem.

The third problem is that the order of conversion is limited to an ascending order from among order numbers of character conversion candidates. The reason is similar to that of the first problem.

The fourth problem is that the mechanism which performs character conversion when it is swung strongly is not suitable as a small portable terminal. The reason is that there is the possibility that the apparatus may drop because a character is not inputted while the apparatus is grasped strongly like a pen.

SUMMARY OF THE INVENTION

It is an object of the present invention to provide a character conversion apparatus for a portable information apparatus which can executes commands for selection of a character conversion candidate, determination, backspacing, escapement and so forth by a simple operation.

In order to attain the object described above, according to the present invention, a body of a portable information apparatus in which a character conversion apparatus is incorporated is operated to be turned in a direction in order to input a command such as selection or determination of a character conversion candidate, backspace or escapement. The character conversion apparatus detects the turning direction and the acceleration in the turning direction of the body of the portable information apparatus, and executes a command defined by the thus detected turning direction and acceleration. It is to be noted that the commands to be inputted and executed by the character conversion apparatus are not limited to those specifically mentioned above, but some other commands may be allocated to different operations for the portable information apparatus.

More particularly, according to an aspect of the present invention, there is provided a character conversion apparatus for a portable information apparatus, comprising an inputting apparatus for inputting a character to the portable information apparatus, a character database memory in which character data are stored, a display apparatus for displaying a character or characters inputted from the inputting apparatus or a character or characters obtained by conversion with reference to the character database memory, acceleration sensor means for detecting an acceleration of the portable information apparatus when one of different turning operations is performed for the portable information apparatus, and a central processing unit for executing one of commands for character processing individually allocated to the turning operations for the portable information apparatus which corresponds to the acceleration detected by the acceleration sensor means.

The acceleration sensor means may include a plurality of acceleration sensors mounted on the information processing apparatus, and different ones of the commands may be allocated individually to detection results of the acceleration sensors.

The acceleration sensors may be mounted on an upper side, a lower side, a left side and a right side of the portable information apparatus and individually detect accelerations which are generated by a turning movement of the portable information apparatus, and the central processing unit may execute commands of character conversion in an ascending order of numbers of character candidates, character conversion in a descending order of the numbers of the candidates, character deletion/cancellation and determination allocated to the detection results of the turning movements of the acceleration sensors to perform character conversion.

The commands regarding the character conversion may be allocated such that the command of ascending order conversion is allocated to a turning movement of the portable information apparatus in one direction and the command of descending order conversion is allocated to another turning movement of the portable information apparatus in the opposite direction.

Alternatively, the commands regarding the character conversion may be allocated such that the command of character deletion and the cancellation command are allocated to one turning direction of the portable information apparatus, and which one of the commands is to be used may be automatically changed over depending upon whether character inputting is proceeding or character conversion is proceeding such that the character deletion command is performed during character inputting whereas the cancellation command is performed during character conversion, whereby a plurality of commands are allocated to the turning movement of the portable information apparatus in one direction.

When each of the acceleration sensors measures a process wherein the magnitude of the acceleration of the turning movement of the portable information apparatus generated by a turning operation for the portable information apparatus first becomes greater than a preset threshold value and then becomes smaller than the threshold value, the central processing unit may execute the command allocated to the turning direction of the turning movement so that one command may be executed by one turning operation for the portable information apparatus.

The acceleration sensors may be mounted on a left side and a right side of the portable information apparatus and each detects an acceleration generated by a turning movement of the portable information apparatus, and the central processing unit may execute the commands of character conversion in an ascending order of numbers of character candidates, character conversion in a descending order of the numbers of the candidates, character deletion/cancellation and determination allocated to the turning operations for the acceleration sensors obtained as the detection results to perform character conversion.

In this instance, the commands regarding the character conversion may each be defined by a unique combination of a direction of a turning movement of the portable information apparatus and a number of times by which a turning operation is applied to the portable information apparatus within a predetermined period of time and may be allocated so as to effect reverse conversion by turning movements of the portable information apparatus in the opposite directions such that the command of ascending order conversion is allocated to a turning movement of the portable information apparatus in one direction and the command of descending order conversion is allocated to another turning movement of the portable information apparatus in the opposite direction.

Alternatively, the commands regarding the character conversion may be allocated such that the command of character deletion and the cancellation command are allocated to a predetermined number of times by which the portable information apparatus is turned in one turning direction, and which one of the commands is to be used may be automatically changed over depending upon whether character inputting is proceeding or character conversion is proceeding such that the character deletion command is performed during character inputting whereas the cancellation command is performed during character conversion, whereby a plurality of commands are allocated to a particular number of times of the turning movement of the portable information apparatus in one direction.

One turning operation may be determined when the magnitude of an acceleration of a turning movement of the portable information apparatus generated by a turning operation for the portable information apparatus becomes lower than a preset threshold value after the magnitude exceeds the threshold value, and a plurality of commands may be allocated to different numbers of times by which the turning operation is performed for the portable information apparatus within a predetermined period of time such that, when a turning operation is performed once for the portable information apparatus in one direction, the command of ascending order conversion is performed once, but when a turning operation is performed twice for the portable information apparatus in the one direction, the character or characters obtained by the conversion are determined, whereby a plurality of command are allocated to one turning direction of the portable information apparatus.

According to another aspect of the present invention, there is provided a character conversion method for a character conversion apparatus of a portable information apparatus which includes an inputting apparatus for inputting a character to the portable information apparatus, a display apparatus for displaying a character or characters inputted from the inputting apparatus or a character or characters obtained by conversion, a central processing unit for executing control operation processing of the portable information apparatus, a plurality of acceleration sensors mounted on an upper side, a lower side, a left side and a right side of the portable information apparatus for detecting accelerations generated by turning operations for the portable information apparatus to which different commands regarding character conversion are allocated, and a character database memory in which character data are stored, the character conversion method comprising the steps of inputting characters through the inputting apparatus, detecting that one of accelerations generated by a turning operation for the portable information apparatus in a longitudinal direction or a lateral direction and detected by the acceleration sensors which has the highest absolute value, and executing that one of the commands regarding character conversion which is allocated to the turning operation of the detected acceleration.

According to another aspect of the present invention, there is provided a character conversion method for a character conversion apparatus of a portable information apparatus which includes an inputting apparatus for inputting a character to the portable information apparatus, a display apparatus for displaying a character or characters inputted from the inputting apparatus or a character or characters obtained by conversion, a central processing unit for executing control operation processing of the portable information apparatus, a plurality of acceleration sensors mounted on a left side and a right side of the portable information apparatus for detecting accelerations generated by turning operations for the portable information apparatus to which different commands regarding character conversion are allocated, and a character database memory in which character data are stored, the character conversion method comprising the steps of inputting characters through the inputting apparatus, detecting that one of accelerations generated when the portable information apparatus is turned once or a plurality of times in a predetermined direction within a predetermined period of time and detected by the acceleration sensors which has the highest absolute value, and executing that one of the commands regarding character conversion which is allocated to the turning operation of the detected acceleration.

The character conversion apparatus and the character conversion methods are advantageous in that character conversion can be performed simply with the portable information apparatus without requirement for complicated operations of an inputting apparatus. Consequently, the character conversion can be utilized effectively on a PDA having an inputting apparatus of a small size or a small portable terminal such as a portable telephone set. The reason is that character conversion can be performed only by tilting the body of the portable information apparatus in a longitudinal direction or a transverse direction.

The character conversion apparatus and the character conversion methods are advantageous also in that character conversion can be performed without taking a hand off the inputting apparatus. The reason is that character conversion can be performed only by tilting the body of the portable information apparatus similarly as in the first advantage described above.

The above and other objects, features and advantages of the present invention will become apparent from the following description and the appended claims, taken in conjunction with the accompanying drawings in which like parts or elements are denoted by like reference symbols.

DESCRIPTION OF THE PREFERRED EMBODIMENT

Figure 1:
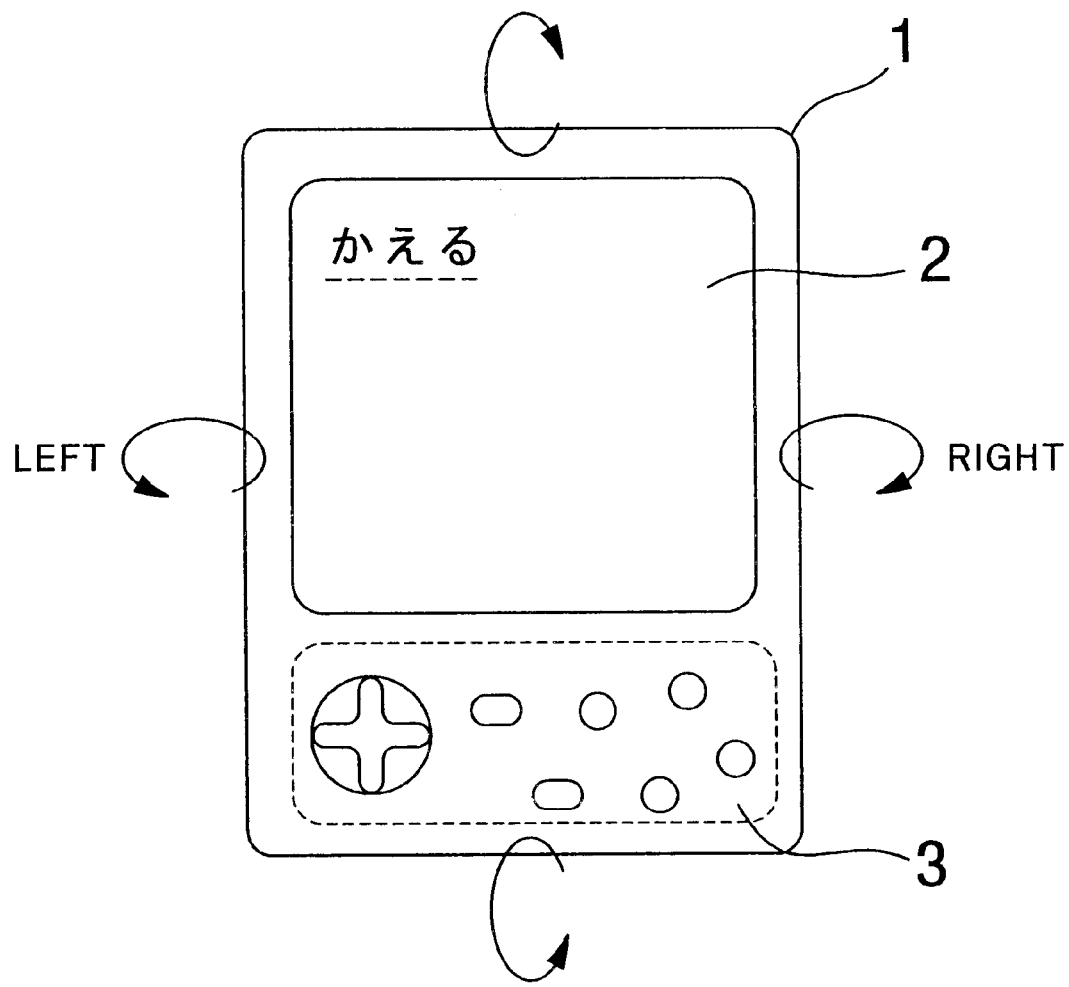
FIG. 1 is a front elevational view showing an appearance of a portable information apparatus in which a character conversion apparatus according to the present invention is incorporated.

Referring first to FIG. 1, there is shown an appearance of a portable information apparatus which includes a character conversion apparatus according to the present invention. The portable information apparatus shown includes a body 1, and a display apparatus 2 and a character inputting apparatus 3 mounted on a front face of the body 1. If a character or characters are inputted from the character inputting apparatus 3 and then the body 1 is tilted or turned once in a longitudinal direction around a transverse axis thereof or in a lateral direction around a longitudinal axis thereof at an acceleration higher than a predetermined acceleration (each arrow mark in FIG. 1 indicates a tilting or turning direction), then the character conversion apparatus executes a process allocated to the direction such as selection or determination of a character conversion candidate once and displays a result of the process on the display apparatus 2.

Figure 2:
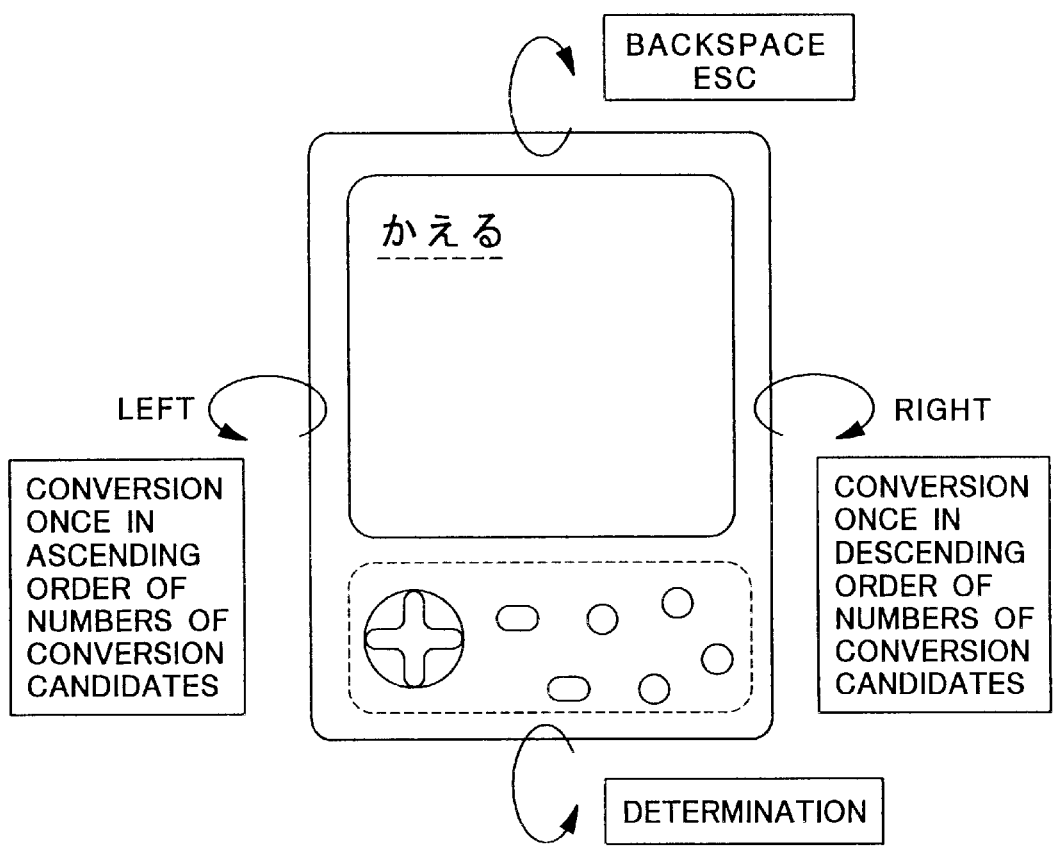
FIG. 2 is a front elevational view illustrating different operations performed for the portable information apparatus of FIG. 1.
Figure 3:
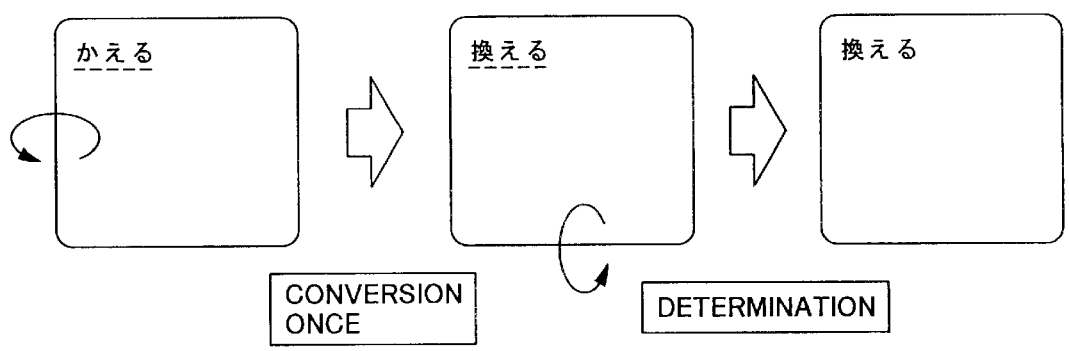
FIG. 3 is a schematic view illustrating an example of character conversion by the character conversion apparatus in the portable information apparatus of FIG. 1.

FIG. 2 illustrates different character conversion operations. In order for the character information apparatus to execute a desired process illustrated in FIG. 2, the body 1 is tilted in a direction around a longitudinal or transverse axis thereof. If a character train かえる ("kaeru") is inputted using the character inputting apparatus 3 first and then the body 1 is tilted leftwardly around an longitudinalaxis thereof once to convert the character train into another character train 換える whereafter, if the body 1 is tilted downwardly around a transverse axis once, then an operation of executing character conversion once and determining the characters as seen in FIG. 3 is performed. In FIG. 3, each curved arrow mark represents a direction in which the body 1 is tilted. Referring back to FIG. 2, the command "Esc" (escapement) is similar to cancellation in significance and indicates that character conversion which is proceeding is cancelled and character inputting is started again. With the portable information apparatus, the command "backspace" or "escapement" can be executed by tilting the body 1 upwardly as seen in FIG. 2. Particularly, the "backspace" is executed before character conversion, and the "escapement" is executed during character conversion.

Figure 4:
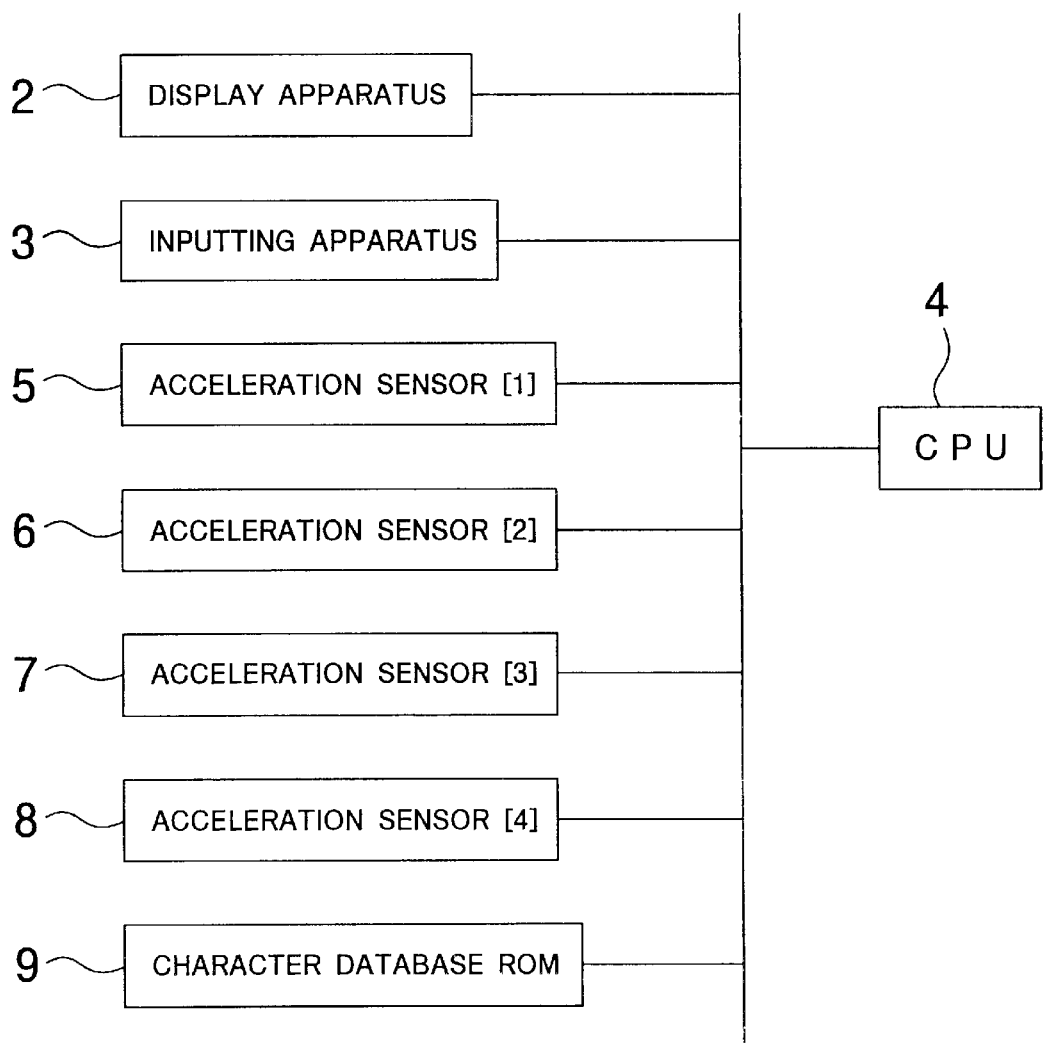
FIG. 4 is a block diagram showing a construction of the character conversion apparatus in the portable information apparatus of FIG. 1.

FIG. 4 shows a construction of the character conversion apparatus to which the present invention is applied. Referring to FIG. 4, the character conversion apparatus shown includes, in addition to the display apparatus 2 and the character inputting apparatus 3 described hereinabove, a CPU (central processing unit) 4, a first acceleration sensor 5, a second acceleration sensor 6, a third acceleration sensor 7, a fourth acceleration sensor 8, and a character database ROM 9. The four acceleration sensors 5 to 8 measure accelerations when the body 1 is tilted longitudinally or laterally around a transverse or longitudinal axis thereof, and can measure also a positive or negative direction of the tilting movement of the body 1 determined in advance.

Figure 5:
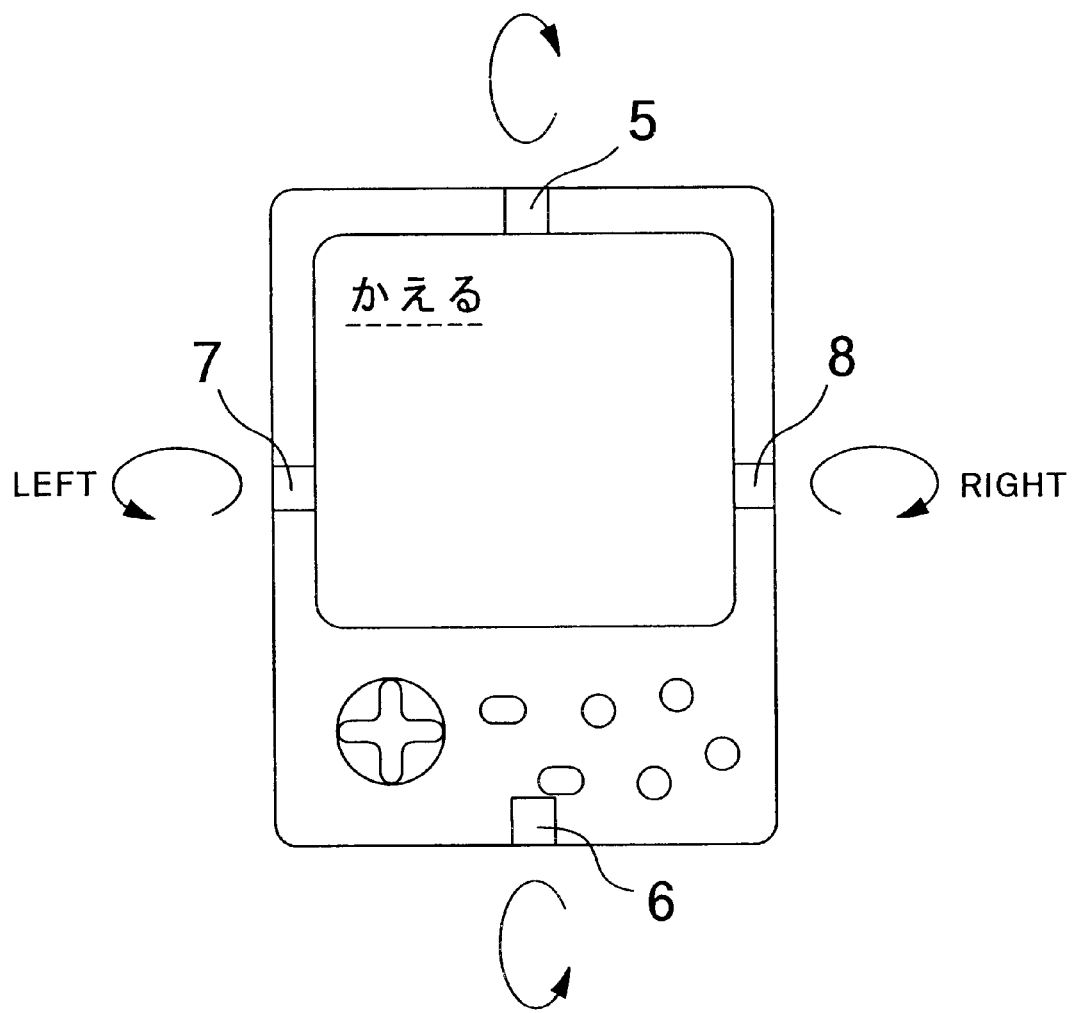
FIG. 5 is a front elevational view of the portable information apparatus of FIG. 1 wherein the character conversion apparatus includes acceleration sensors mounted on the portable information apparatus.

FIG. 5 shows at which positions of the body 1 the first to fourth acceleration sensors 5 to 8 are mounted. Referring to FIG. 5, the four acceleration sensors 5 to 8 are mounted separately from each other on the top, bottom, left and right sides of the body 1, respectively. An acceleration of the body 1 in a longitudinal direction can be measured by the first acceleration sensor 5 and the second acceleration sensor 6 while an acceleration of the body 1 in a transverse direction can be measured by the third acceleration sensor 7 and the fourth acceleration sensor 8. The reason why two acceleration sensors are disposed around each of transverse and longitudinal axes of the body 1 is that it is made possible to measure, when the body 1 is tilted longitudinally or laterally around a transverse or longitudinal axis, a maximum acceleration of the body 1 at whichever position of the body 1 the transverse axis or the longitudinal axis is in the longitudinal or transverse direction.

Figure 6:
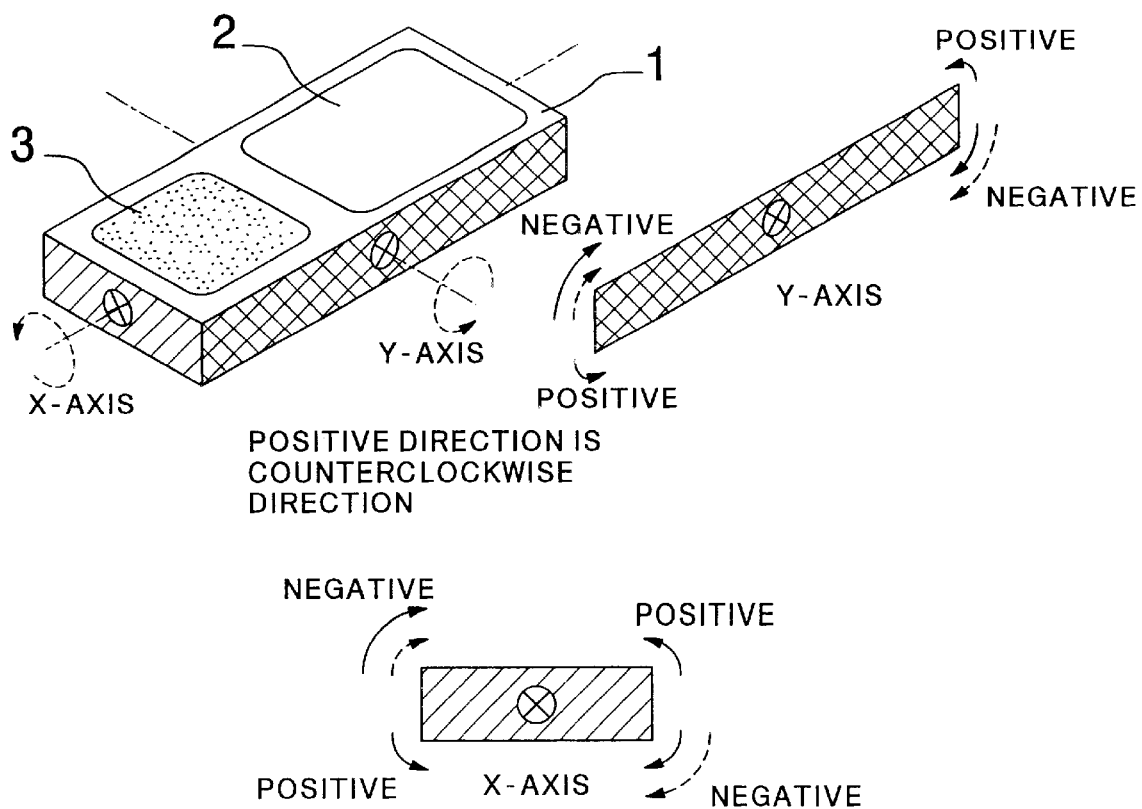
FIG. 6 is a fragmentary sectional view illustrating positive and negative turning directions by turning operations performed for the portable information apparatus of FIG. 5.

Now, the negative and positive directions of the accelerations are described with reference to FIG. 6. To tilt the body 1 in a longitudinal direction signifies to turn the body 1 around a transverse axis, that is, a y-axis in FIG. 6. Similarly, to tilt the body 1 in a lateral direction signifies to turn the body 1 around a longitudinal axis, that is, an x-axis in FIG. 6. The positive and negative directions in the longitudinal direction are defined such that, when the right side face of the body 1 is viewed with the display apparatus 2 directed upwardly, the counterclockwise turning direction is determined as the positive direction. Similarly, the positive and negative directions in the lateral direction are defined such that, when the nearer side face of the body 1 is viewed with the display apparatus 2 directed upwardly, the counterclockwise turning direction is determined as the positive direction. Referring to FIG. 5, with regard to the longitudinal direction, the direction in which the front face of the body 1 is tilted downwardly is the positive direction whereas the direction in which the front face of the body 1 is tilted upwardly is the negative direction, and with regard to the lateral direction, the direction in which the front face of the body 1 is tilted leftwardly is the positive direction whereas the direction in which the front face of the body 1 is tilted rightwardly is the negative direction.

Now, a flow of operations of the character conversion apparatus is described with reference to the block diagram of FIG. 4. If the CPU 4 detects a character input from the character inputting apparatus 3 and then detects from the first to fourth acceleration sensors 5 to 8 that the body 1 is tilted with an acceleration higher than a predetermined acceleration, then it discriminates from the direction of the longitudinal or lateral acceleration in which one of the longitudinal and lateral directions the body 1 has been tilted, and then executes the command allocated to the detected direction of the tilting movement. Five different commands are available including a command for determining a character or characters, another command for executing backspacing (deletion), a further command for executing escapement (Esc: cancellation), a still further command for displaying one of character conversion candidates in an ascending order of numbers applied to the character conversion candidates to effect conversion once with reference to the character database ROM 9, and a yet further command for displaying one of such character conversion candidates in a descending order of the numbers applied to the character conversion candidates to effect conversion once with reference to the character database ROM 9. By tilting the body 1 longitudinally or laterally, one of the commands illustrated in FIG. 2 is executed once for one such tilting operation. The character database ROM 9 stores character data of the cursive kana characters, kanji characters, symbols and so forth and manages the individual data with numbers applied to them. Also after a character is inputted, character inputting can be repeated without tilting the body 1.

Figure 7:
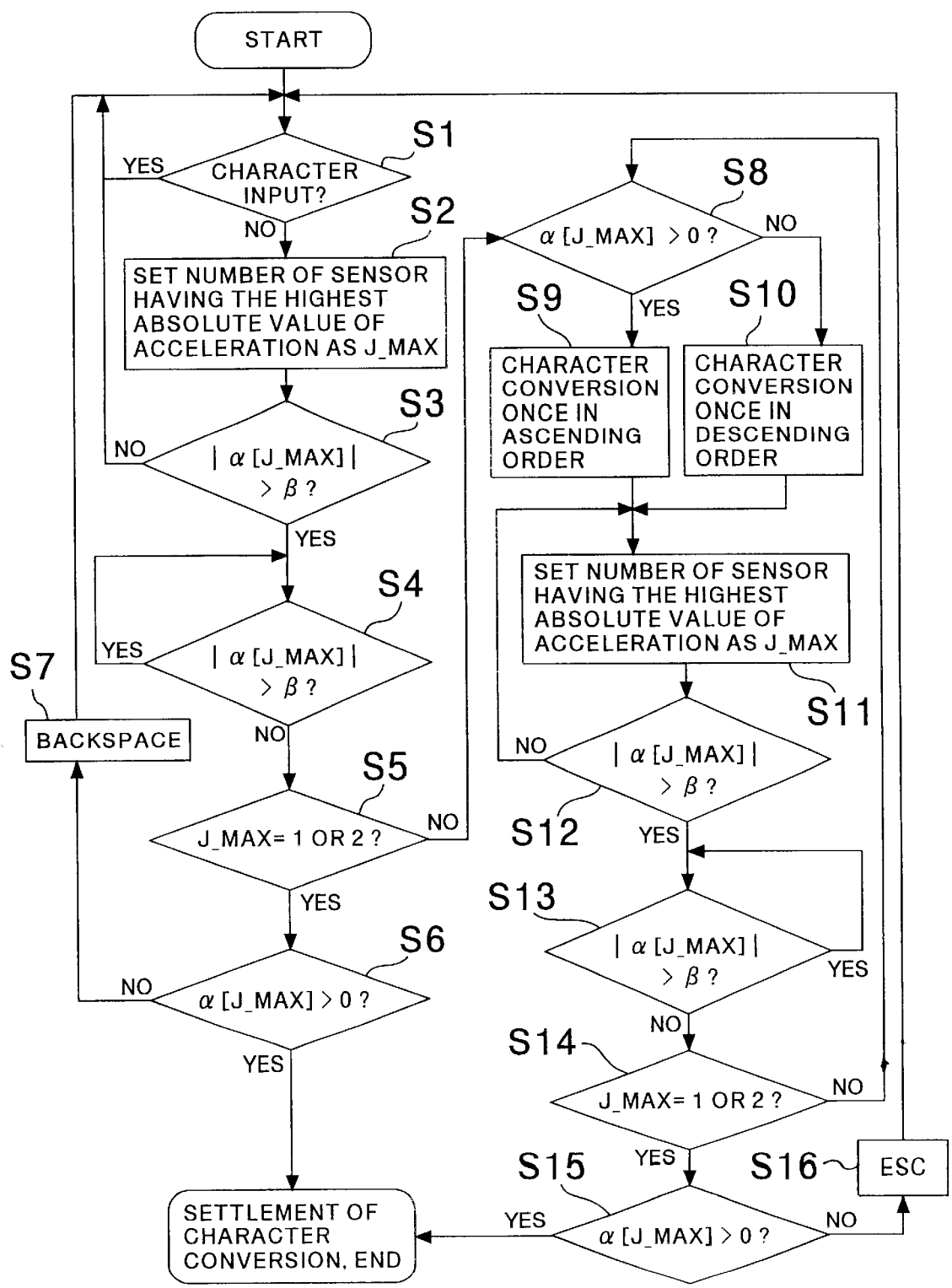
FIG. 7 is a flow chart illustrating a flow of control of the character conversion apparatus of FIG. 5.

A flow of control of the character conversion apparatus is described below with reference to a flow chart of FIG. 7. First, if the CPU 4 detects an input of a character from the character inputting apparatus 3, then it checks whether or not a next character is inputted (step S1). If a next character input is detected (Yes in step S1), then the control of the CPU 4 returns to step S1, but if no next character input is detected (No in step S1), then the CPU 4 detects accelerations $\alpha[1]$ to $\alpha[4]$ obtained from the first to fourth acceleration sensors 5 to 8 when the body 1 is tilted, and recognizes the number of that one of the first to fourth acceleration sensors 5 to 8 which exhibits the highest absolute value of the acceleration as j_max (step S2). For example, if the absolute value of the acceleration of the fourth acceleration sensor 8 is the highest, then j_max=4. Here, the number in the parenthesis following the acceleration $\alpha$ corresponds to the sensor number of the acceleration sensor. For example, the acceleration of the third acceleration sensor 7 is $\alpha[3]$.

Then, the CPU 4 discriminates whether or not the absolute value of the acceleration $\alpha[j\_max]$ is greater than $\beta$ (step S3). If the discrimination is in the negative (No in step S3), then the control returns to step S1. However, if the absolute value of the acceleration $\alpha[j\_max]$ is greater than $\beta$ (Yes in step S3), then the control advances to step S4, in which the CPU 4 discriminates whether or not the absolute value of the acceleration $\alpha[j\_max]$ is greater than $\beta$. Then, while the absolute value of the acceleration $\alpha[j\_max]$ remains greater than $\beta$ (Yes in step S4), the CPU 4 repeats the processing in step S4. Then, when the absolute value of the acceleration $\alpha[j\_max]$ becomes equal to or smaller than $\beta$ (No in step S4), the control advances to step S5. Here, $\delta$ is a threshold value for the acceleration to be used for discrimination of whether or not the body 1 has been tilted, and can be set arbitrarily by the user.

Figure 8:
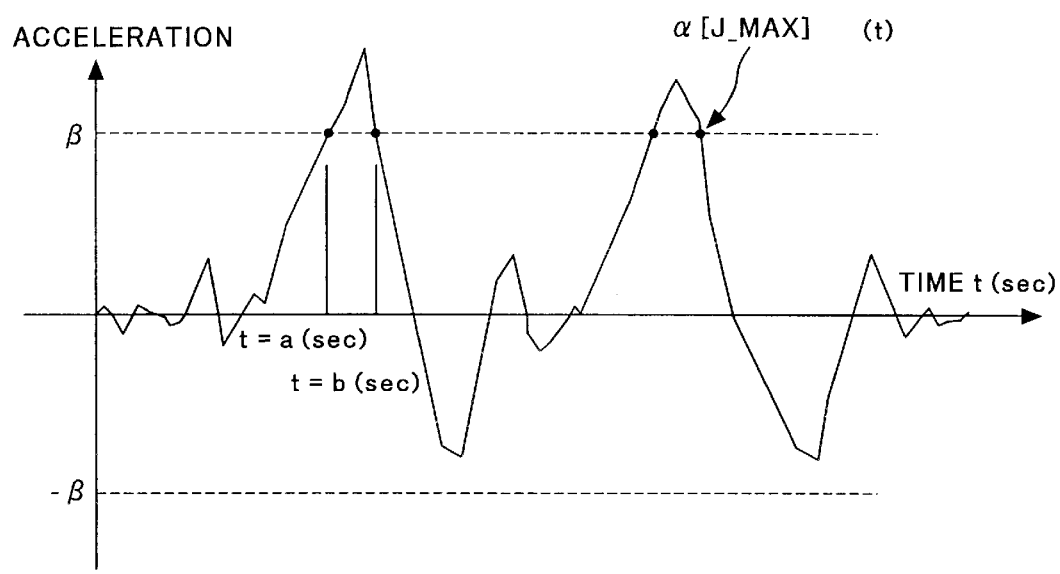
FIG. 8 is a diagram illustrating a variation with respect to time of an acceleration applied to an acceleration sensor shown in FIG. 5 when the portable information apparatus is turned.

The reason why the processing in step S4 is used is described with reference to FIG. 8. In FIG. 8, the axis of abscissa indicates the time and the axis of ordinate indicates the acceleration. Since the control of the CPU 4 advances to next step S5 after a process wherein a condition of $|\alpha[j\_max]|>\beta$ is entered at t=a (sec) and then another condition of $|\alpha[j\_max]|<=\beta$ is entered at t=b (sec) as seen in FIG. 8, one command can be executed by an operation of tilting the body 1 once while the same command is prevented from being executed repetitively.

The reason why the absolute value of the acceleration $\alpha[j\_max]$ is used for comparison is that it is intended to allow application of an acceleration of a negative value.

In step S5, it is discriminated whether or not j_max is equal to 1 or 2. If j_max is equal to 1 or 2, then since the absolute value of one of the accelerations in the longitudinal direction is the highest, the CPU 4 recognizes that the body 1 has been tilted in a longitudinal direction and advances the control thereto to step S6. Instep S6, the CPU 4 discriminates whether or not the acceleration $\alpha[j\_max]$ is in the positive. If the acceleration $\alpha[j\_max]$ is in the positive (Yes in step S6), then the CPU 4 recognizes that the body 1 has been tilted downwardly and determines the character or characters without performing character conversion at all. On the contrary if it is discriminated in step S6 that the acceleration α[j_max] is in the negative (No in step S6), then the CPU 4 recognizes that the body 1 has been tilted upwardly and executes backspacing (step S7). Thereafter, the control returns to step S1.

Figure 9:
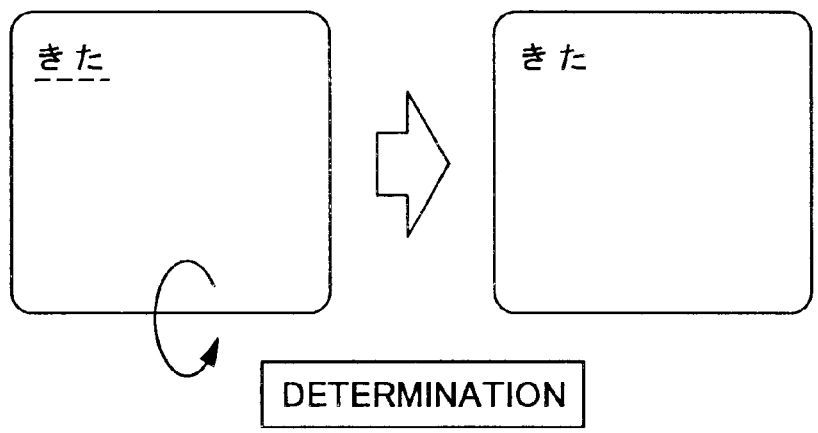
FIG. 9 is a schematic view illustrating a variation in display when a "determination" command in a character conversion operation is executed by the character conversion apparatus in the portable information apparatus of FIG. 5.
Figure 10:
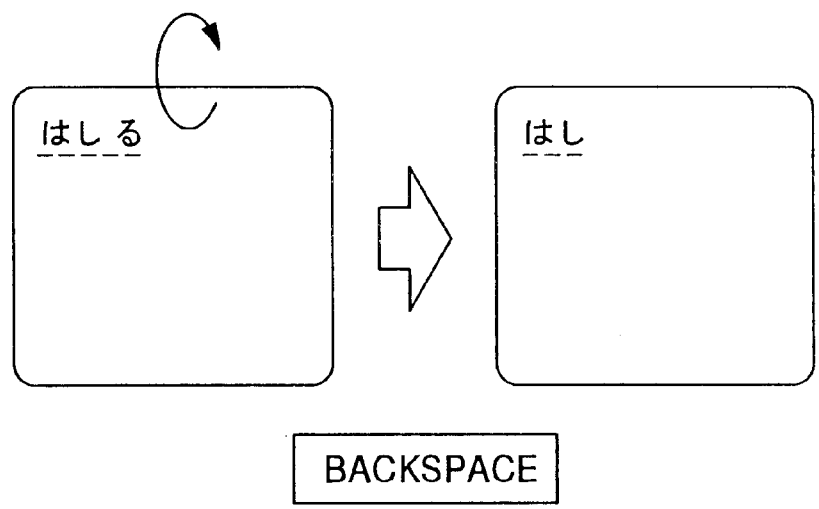
FIG. 10 is a schematic view illustrating a variation in display when a "backspace" command in a character conversion operation is executed by the character conversion apparatus in the portable information apparatus of FIG. 5.

If it is recognized in step S6 that the acceleration is in the positive and a character or characters have been inputted in the form of cursive kana characters, the cursive kana characters are determined as characters as seen in FIG. 9, but if it is recognized in step S6 that the acceleration is in the negative, then backspacing is executed to delete one of the inputted characters.

If it is discriminated in step S5 that j_max is not equal to 1 or 2 (No in step S5), then since the absolute value of an acceleration in a lateral direction is the highest, the CPU 4 recognizes that the body 1 has been tilted in a lateral direction and advances the control thereof to step S8. In step S8, it is discriminated whether or not the acceleration α[j_max] is in the positive. If the acceleration α[j_max] is in the positive (Yes in step S8), then the CPU 4 performs character conversion of the inputted characters once, that is, selects one of character conversion candidates of the character database ROM 9 in the ascending order of the numbers applied to the character conversion candidates (step S9). On the contrary if the acceleration α[j_max] is in the negative (No in step S8), then the CPU 4 performs character conversion of the inputted characters once, that is, selects one of the character conversion candidates of the character database ROM 9 in the descending order of the numbers applied to the character conversion candidates (step S9). After character conversion is performed in the ascending or descending order in this manner, the accelerations are measured and the sensor number of the sensor which exhibits the highest absolute value of the acceleration value is recognized as j_max (step S11).

Then, after the CPU 4 recognizes that the condition of |α[j_max]|>β is reached (Yes in step S12) and then the condition of |α[j_max]|<=β is reached (No in step S13) similarly as in steps S3 and S4, respectively, the control advances to step S14. If the discrimination in step S13 is |α[j_max]|>β (Yes in step S13), then the processing in step S13 is repeated.

Figure 11:
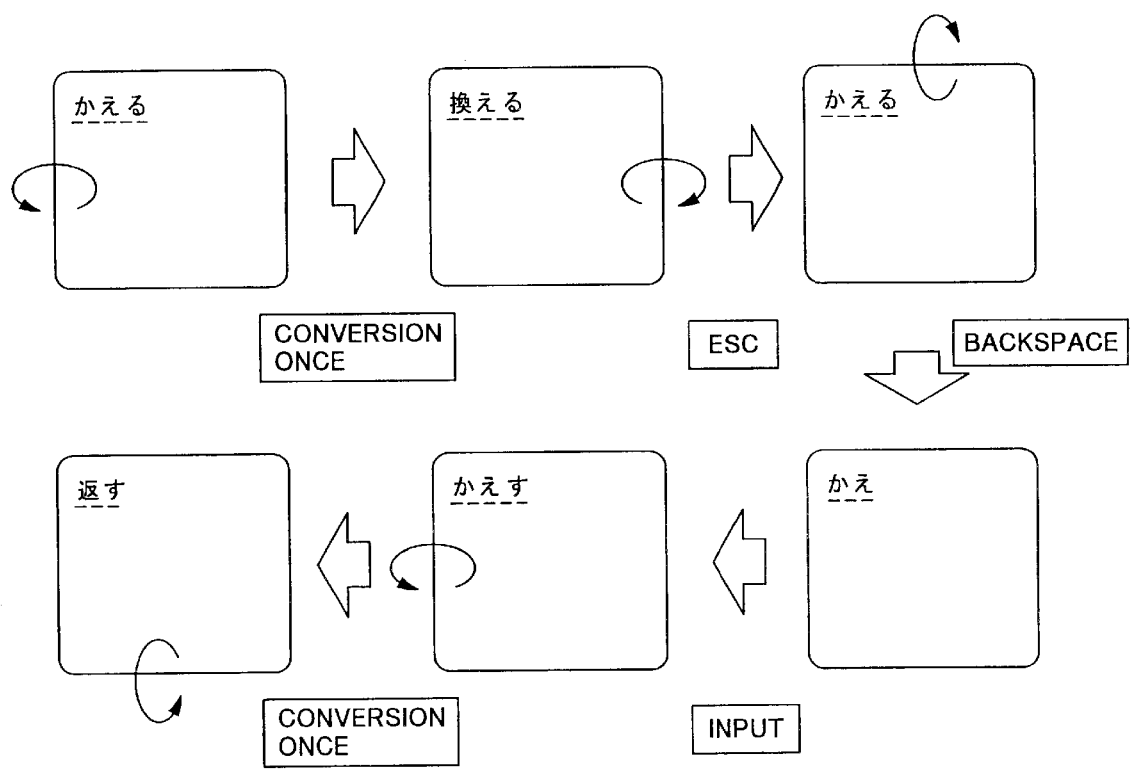
FIG. 11 is a schematic view illustrating a variation in display when "conversion", "escape", "backspace", "input" and "conversion" commands are successively executed by the character conversion apparatus in the portable information apparatus of FIG. 5.

In step S14, it is discriminated whether or not j_max is equal to 1 or 2. If j_max is equal to 1 or 2 (Yes in step S14), then the CPU 4 recognizes that the body 1 has been tilted in the longitudinal direction and then discriminates whether or not the acceleration α[j_max] is in the positive (step S15). If the acceleration α[j_max] is in the positive (Yes in step S15), then the character or characters are determined. However, if the acceleration α[j_max] is in the negative (No in step S15), then the escapement command is executed (step S16), whereafter the control returns to step S1. An example of the procedure described is illustrated in FIG. 11. FIG. 11 represents a process wherein, after character conversion is executed, the result of the conversion is cancelled and one character is deleted from the characters by using the escapement command, whereafter a character is inputted from the inputting apparatus 3 and character conversion is performed again.

If j_max is not equal to 1 or 2 in step S14 (No in step S14), then the CPU 4 recognizes that the body 1 has been tilted in the lateral direction and returns the control thereof to step S8 so that character conversion may be performed once.

Figure 12:
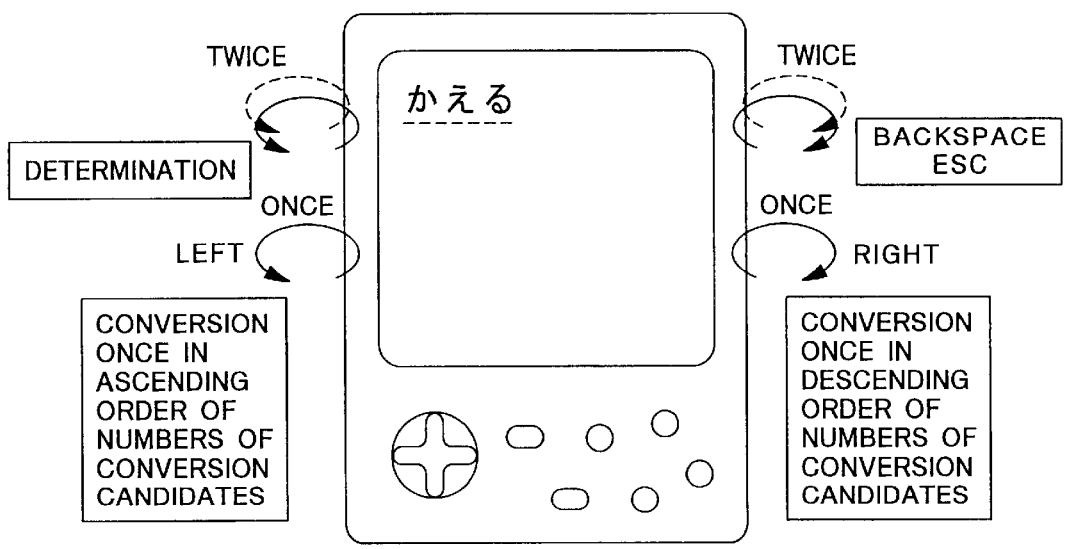
FIG. 12 is a front elevational view showing an appearance of another portable information apparatus to which another character conversion apparatus according to the present invention is incorporated.

FIG. 12 shows an appearance of a portable information apparatus in which another character conversion apparatus to which the present invention is applied is incorporated together with different operations performed for the portable information apparatus. Referring to FIG. 12, the character conversion apparatus operates such that selection or determination of a character conversion candidate, backspacing or the like can be performed by tilting the body of the portable information apparatus in a lateral direction around a longitudinal axis. Here, the character conversion apparatus can execute different commands depending upon whether the body is tilted once or is successively tilted twice within a predetermined interval of time.

Figure 13:
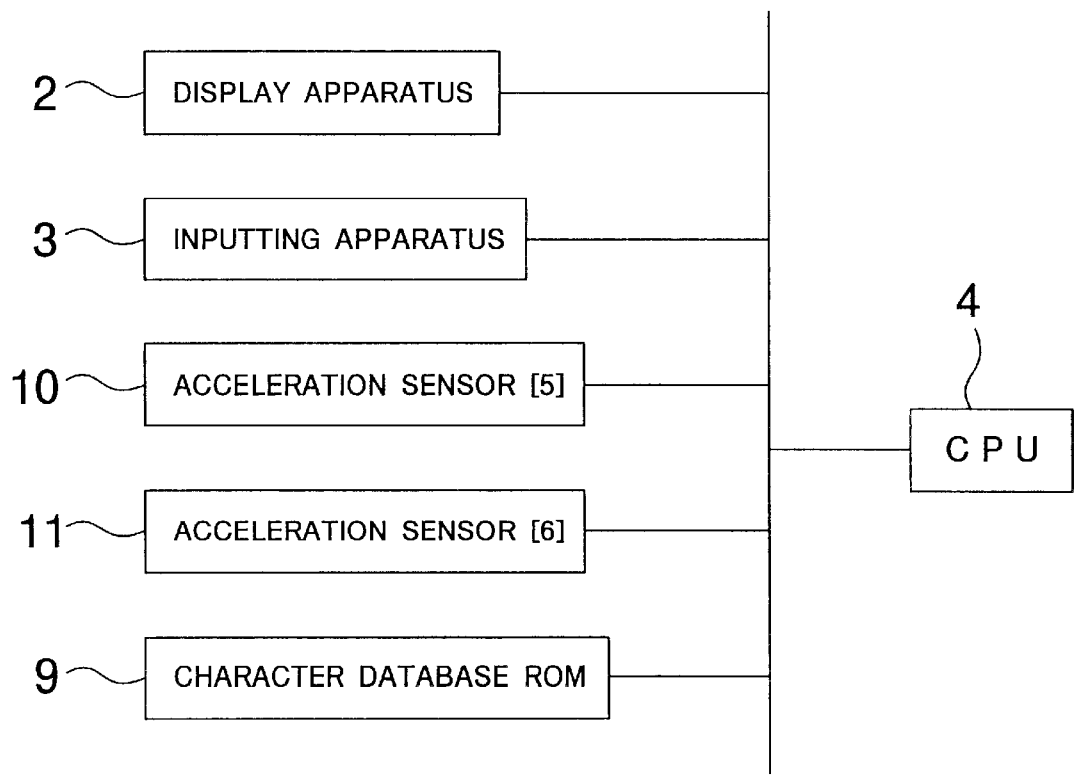
FIG. 13 is a block diagram showing a construction of the character conversion apparatus in the portable information apparatus of FIG. 12.

FIG. 13 shows a construction of the character conversion apparatus incorporated in the portable information apparatus of FIG. 13. Referring to FIG. 13, the character conversion apparatus includes a display apparatus 2, an inputting apparatus 3, a CPU 4, a fifth acceleration sensor 10, a sixth acceleration sensor 11, and a character database ROM 9. The display apparatus 2, character inputting apparatus 3, CPU 4 and character database ROM 9 are similar to those described hereinabove with reference to FIG. 3. The fifth and sixth acceleration sensors 10 and 11 can measure also the positive and negative directions of the tilting movement of the body of the portable information apparatus.

Figure 14:
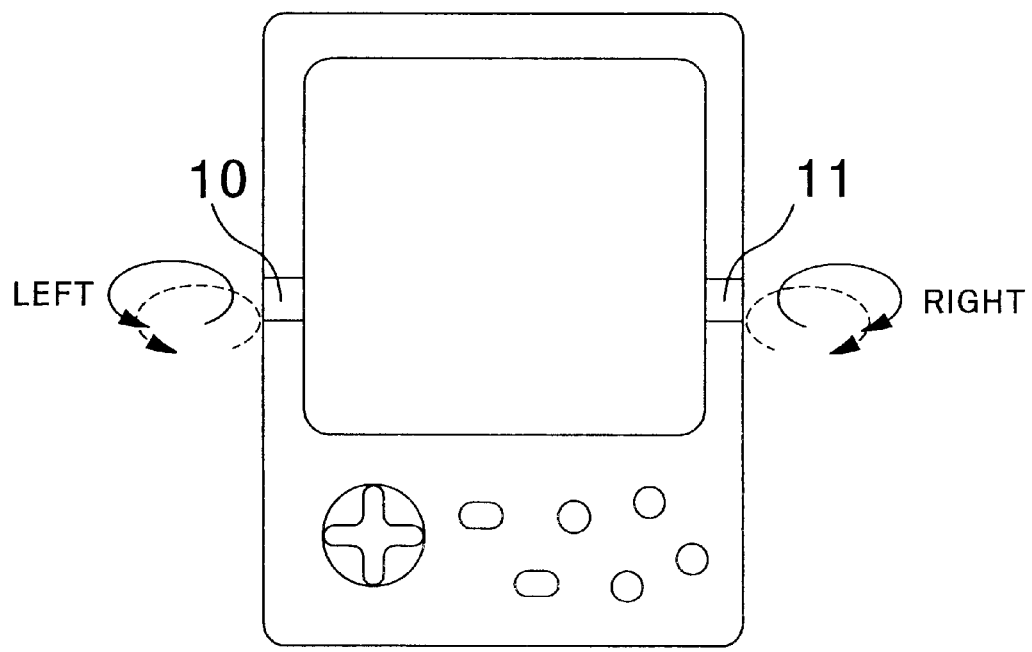
FIG. 14 is a front elevational view showing acceleration sensors of the character conversion apparatus provided in the portable information apparatus of FIG. 12.

The fifth acceleration sensor 10 and the sixth acceleration sensor 11 are mounted at such positions, for example, as seen in FIG. 14 on the body 1. The fifth acceleration sensor 10 and the sixth acceleration sensor 11 measure the accelerations of the body 1 in the lateral direction including the positive and negative directions which are determined similarly as in FIG. 6.

A flow of operations of the character conversion apparatus is described with reference to FIG. 13. If the CPU 4 detects that a character or characters are inputted from the inputting apparatus 3 and then detects from the fifth acceleration sensor 10 and the sixth acceleration sensor 11 that the body 1 has been tilted with an acceleration higher than a predetermined acceleration β, then it discriminates whether or not the body 1 has been tilted with an acceleration higher than the predetermined acceleration β within a predetermined interval of time δ (sec) once again. If this is detected, then the CPU 4 recognizes that the body 1 has been successively tilted twice, but if this is not detected, then the CPU4 recognizes that the body 1 has been tilted once. Then, the CPU 4 executes a command which corresponds to the sign (positive/negative) of the acceleration of the tilting in the lateral direction and the number of times of the tilting. Contents of such commands are similar to those described hereinabove with reference to FIG. 3.

Figure 15:
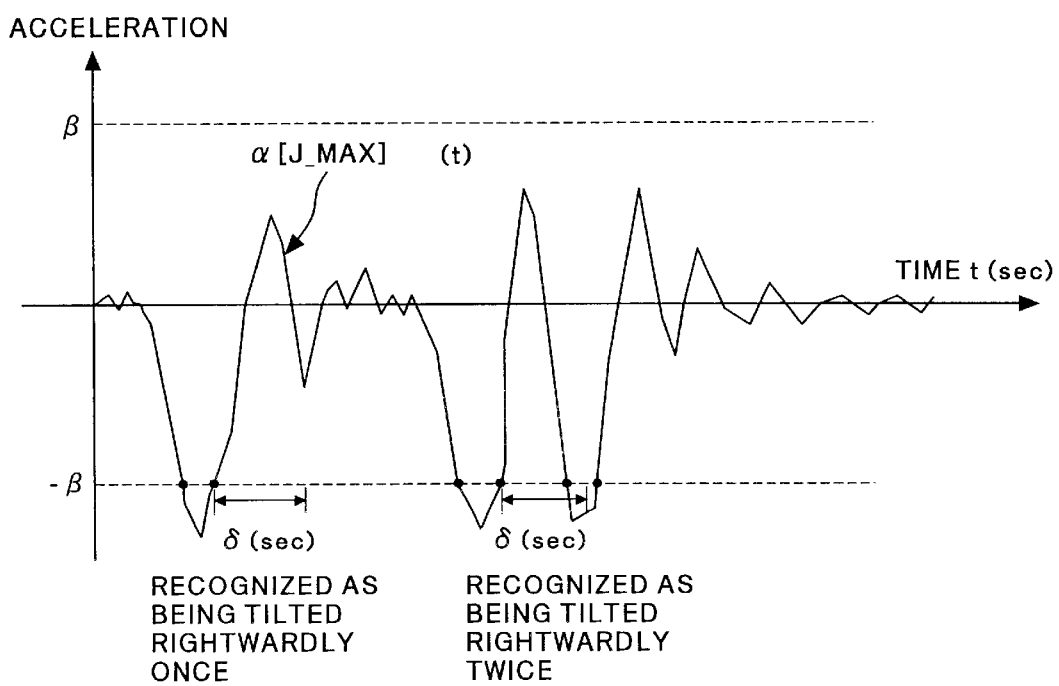
FIG. 15 is diagram illustrating a variation with respect to time of an acceleration detected by an acceleration sensor shown in FIG. 14.

A method of discriminating whether the body 1 is tilted once or successively twice is described with reference to FIG. 15. In FIG. 15, the axis of abscissa indicates the time and the axis of ordinate indicates the acceleration. If, after the condition of the acceleration α[j_max]<-β is detected and the condition α[j_max]>"β is detected, the condition α[j_max]<-β is detected again within δ (sec), then the CPU 4 recognizes that the body 1 has been tilted twice in the rightward direction, but if the condition α[j_max]<-β is not detected again within δ (sec), then the CPU 4 recognizes that the body 1 has been tilted in the rightward direction once. If the body 1 is tilted in the leftward direction, then the condition α[j_max]>β is detected. Also in this instance, the discrimination between once and twice is performed in a similar manner. By tilting the body 1 laterally, any of the commands illustrated in FIG. 12 is executed.

Figure 16:
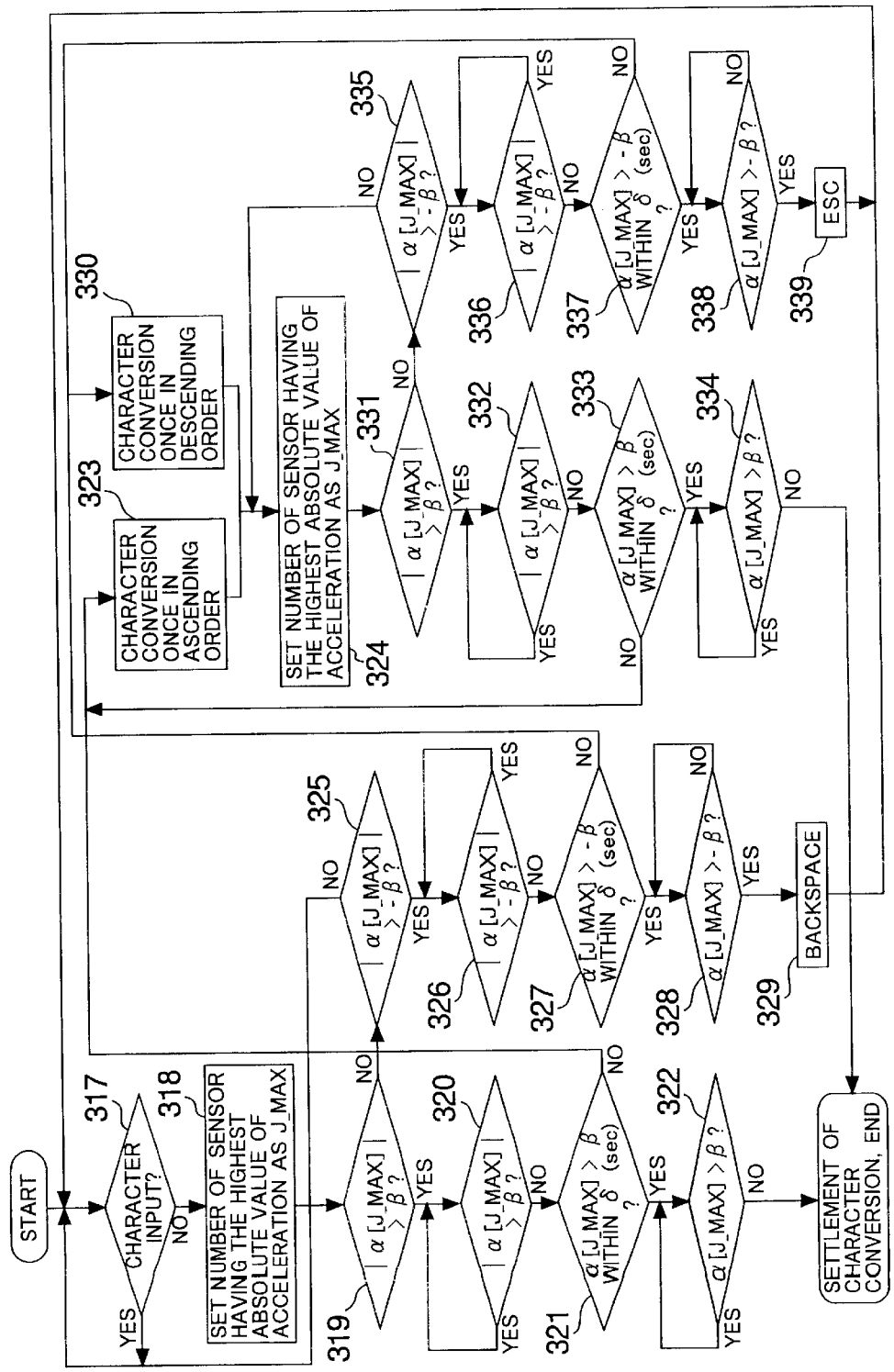
FIG. 16 is a flow chart illustrating a flow of control of the character conversion apparatus in the portable information apparatus of FIG. 12.

FIG. 16 is a flow chart illustrating a flow of control of the character conversion apparatus of FIG. 13. The flow chart includes processing steps S17 to S39. The processing of the flow chart of FIG. 16 is different from the processing of the flow chart of FIG. 7 in that it employs a modified algorithm in that a character or characters are determined by tilting the body 1 leftwardly twice in place of tilting the body 1 downwardly and backspacing or escapement is executed by tilting the body 1 rightwardly twice in place of tilting the body 1 upwardly.

The character conversion apparatus of FIG. 13 is more advantageous than the character conversion apparatus of FIG. 4 in that the number of acceleration sensors can be reduced.

While preferred embodiments of the present invention have been described using specific terms, such description is for illustrative purposes only, and it is to be understood that changes and variations may be made without departing from the spirit or scope of the following claims.

What is claimed is:

1. A character conversion apparatus for a portable information apparatus, comprising:
   an inputting apparatus for inputting a character to said portable information apparatus;
   a character database memory in which character data are stored;
   a display apparatus for displaying a character or characters inputted from said inputting apparatus or a character of characters obtained by conversion with reference to said character database memory;
   at least four acceleration sensor means arranged in a distributed manner on the left, right, upper and lower sides of the portable information apparatus for detecting an acceleration thereof when one of different turning operations is performed for said portable information apparatus;
   each of said acceleration sensors detecting a preset threshold value of an individually associated acceleration, a plurality of commands for character conversion identified by said commands for a character process according to the acceleration sensor that detects acceleration having a higher absolute value than absolute values of accelerations detected by the other acceleration sensors and executing a first identified command when the detected acceleration falls below the threshold value, executing a second identified command different from the first identified command when the acceleration sensor detects more than one consecutive acceleration having a higher absolute value than absolute values of accelerations detected by the other acceleration sensors within a predetermined period of time; and
   a central processing unit for executing said one of commands for character processing individually allocated to the turning operations for said portable information apparatus which corresponds to the acceleration detected by said acceleration sensor means.

2. A character conversion apparatus as claimed in claim 1, wherein said acceleration sensor means includes said plurality of acceleration sensors mounted on said information processing apparatus, and different ones of the commands are allocated individually to detection results of said acceleration sensors.

3. A character conversion apparatus as claim in claim 2, wherein said acceleration sensors are mounted on an upper side, a lower side, a left side and a right side of said portable information apparatus and individually detect accelerations which are generated by a turning movement of said portable information apparatus, and said central processing unit executes commands of character conversion in an ascending order of numbers of character candidates, character conversion in a descending order of the numbers of the candidates, character deletion/cancellation and determination allocated to the detection results of the turning movement of said acceleration sensors to perform character conversion.

4. A character conversion apparatus as claimed in claim 3, wherein the commands regarding the character conversion are allocated such that the command of ascending order conversion is allocated to a turning movement of said portable information apparatus in one direction and the command of descending order conversion is allocated to another turning movement of said portable information apparatus in the opposite direction.

5. A character conversion apparatus as claimed in claim 3, wherein the commands regarding the character conversion are allocated such that the command of character deletion and the cancellation command are allocated to one turning direction of said portable information apparatus, and which one of the commands is to be used is automatically changed over depending upon whether character inputting is proceeding or character conversion is proceeding such that the character deletion command is performed during character inputting whereas the cancellation command is performed during character conversion, whereby a plurality of commands are allocated to the turning movement of said portable information apparatus in one direction.

6. A character conversion apparatus as claimed in claim 3, wherein, when each of said acceleration sensors measures a process having a magnitude of the acceleration of the turning movement of said portable information apparatus generated by a turning operation for said portable information apparatus first becomes greater than said preset threshold value and then becomes smaller than the threshold value, said central processing unit executes the command allocated to the turning direction of the turning movement so that any one command may be executed by a selected one or more turning operation of said portable information apparatus.

7. A character conversion apparatus as claimed in claim 2, wherein said acceleration sensors are mounted on a left side and a right side of said portable information apparatus and each detects an acceleration generated by one or more turning movements of said portable information apparatus, and said central processing unit executes the commands of character conversion in an ascending order of numbers of character candidates, character conversion in a descending order of the numbers of the candidates, character deletion/cancellation and determination allocated to the turning operations for said acceleration sensors obtained as the detection results to perform character conversion.

8. A character conversion apparatus as claimed in claim 7, wherein the commands regarding the character conversion are each defined by a unique combination of a direction of a turning movement of said portable information apparatus and a number of times by which a turning operation is applied to said portable information apparatus within a predetermined period of time and are allocated so as to effect reverse conversion by turning movements of said portable information apparatus in the opposite directions such that the command of ascending order conversion is allocated to a turning movement of said portable information apparatus in one direction and the command of descending order conversion is allocated to another turning movement of said portable information apparatus in the opposite direction.

9. A character conversion apparatus as claimed in claim 7, wherein the commands regarding the character conversion are allocated such that the command of character deletion and the cancellation command are allocated to a predetermined number of times by which said portable information apparatus is turned in one turning direction, and which one of the commands is to be used is automatically changed over depending upon whether character inputting is proceeding or character conversion is proceeding such that the character deletion command is performed during character inputting whereas the cancellation command is performed during character conversion, whereby a plurality of commands are allocated to a particular number of times of one or more turning movements of said portable information apparatus in one direction.

10. A character conversion apparatus as claimed in claim 7, wherein one turning operation is determined when the magnitude of an acceleration of a turning movement of said portable information apparatus generated by a turning operation for said portable information apparatus becomes lower than a preset threshold value after the magnitude exceeds the threshold value, and a plurality of commands are allocated to different numbers of times by which the turning operation is performed for said portable information apparatus within said predetermined period of time such that, when a turning operation is performed once for said portable information apparatus in one direction, the command of ascending order conversion is performed once, but when a turning operation is performed twice for said portable information apparatus in the one direction, the character or characters obtained by the conversion are determined, whereby a plurality of command are allocated to one turning direction of said portable information apparatus.

11. A character conversion method for a character conversion apparatus of a portable information apparatus which includes an inputting apparatus for inputting a character to said portable information apparatus, a display apparatus for displaying a character or characters inputted from said inputting apparatus or a character or characters obtained by conversion, a central processing unit for executing a control operation processing of said portable information apparatus, a plurality of acceleration sensors mounted on an upper side, a lower side, a left side and a right side of said portable information apparatus for detecting accelerations exceeding a preset threshold level and generated by turning operations for said portable information apparatus, said individual turning operations indicating to which different commands regarding character conversion are allocated, and a character database memory in which character data are stored, said character conversion method comprising of the steps of:

inputting characters through said inputting apparatus;

detecting one or more accelerations having a higher absolute value than absolute values of accelerations detected by the other acceleration sensors by one of said acceleration sensors that one of said accelerations generated by a turning operation for said portable information apparatus in a longitudinal direction or a lateral direction and detected by one of said acceleration sensors which has the highest absolute value above said threshold level for responding to a detected acceleration;

executing that one of the commands regarding character conversion which is indicated by the highest absolute value allocated to the turning operation of the detected one or more accelerations, said execution occurring when said detected acceleration falls below said threshold level; and executing a different one of the commands regarding character conversion which is indicated by more than one consecutive highest absolute value allocated to the turning operation of the detected one or more accelerations, said execution occurring when said detected accelerations fall below said threshold level within a predetermined period of time.

12. A character conversion method for a character conversion apparatus of a portable information apparatus which includes an inputting apparatus for inputting a character to said portable information apparatus, a display apparatus for displaying a character or characters inputted from said inputting apparatus or a character or characters obtained by conversion, a central processing unit for executing a control operation processing of by said portable information apparatus, at least four acceleration sensors mounted on a left, right, upper and lower sides of said portable information apparatus for detecting accelerations exceeding a preset threshold level and generated by turning operations for of said portable information apparatus, to which different commands regarding character conversion are being allocated to each of said acceleration sensors, and a character database memory in which character data are stored, said character conversion method comprising the steps of:

inputting characters through said inputting apparatus;

detecting one or more accelerations having a higher absolute value than absolute values of accelerations detected by the other acceleration sensors that one of said accelerations above said threshold level which is generated when said portable information apparatus is turned once or a plurality of times in a predetermined direction within a predetermined period of time, and detected by one of said acceleration sensors which has receives the highest absolute acceleration value above said threshold responding to said detected acceleration;

executing that one of the commands regarding character conversion which is allocated to the turning operation of the detected acceleration, said execution occurring when said detected acceleration falls below said threshold level; and executing a different one of the commands regarding character conversion which is allocated to more than one consecutive turning operation of the detected one or more accelerations, said execution occurring when said detected accelerations fall below said threshold level within a predetermined period of time.

* * * * *